United States Patent [19]

Takei et al.

[11] Patent Number: 4,745,997

[45] Date of Patent: May 24, 1988

[54] OFFSET DETECTING DEVICE FOR TROLLEY-ASSISTED VEHICLES

[75] Inventors: Hidetoshi Takei, Ayase; Takumi Nozaka, Atsugi; Teruo Minami, Kawasaki, all of Japan

[73] Assignees: Toyo Denki Seizo Kabushiki Kaisha; Komatsu, Ltd., both of Tokyo, Japan

[21] Appl. No.: 76,336

[22] Filed: Jul. 22, 1987

[30] Foreign Application Priority Data

Jul. 29, 1986 [JP] Japan .................................. 61-176583

[51] Int. Cl.⁴ ........................... B60L 5/04; B60L 9/00
[52] U.S. Cl. ............................................ 191/87; 191/8
[58] Field of Search ............................ 191/8, 85–87, 191/59.1, 90

[56] References Cited

U.S. PATENT DOCUMENTS

| 757,107 | 4/1904 | Gibbs | 191/8 |
| 1,682,432 | 8/1928 | Smith | 191/8 |
| 2,018,241 | 10/1935 | Viele | 191/8 |
| 4,340,920 | 7/1982 | Gill | 191/8 |
| 4,694,125 | 9/1987 | Takei | 191/87 |

Primary Examiner—William L. Freeh
Attorney, Agent, or Firm—Silverman, Cass, Singer & Winburn Ltd.

[57] ABSTRACT

Offset condition detecting device for detecting offset condition of pantographs from overhead contact wires by means of electric current detected by a contact element mounted on the pantograph and insulated therefrom. The detection is made electrically and in case of emergency the pantographs are lowered down at high speed to prevent damage of pantographs of trolley-assisted vehicles.

4 Claims, 4 Drawing Sheets

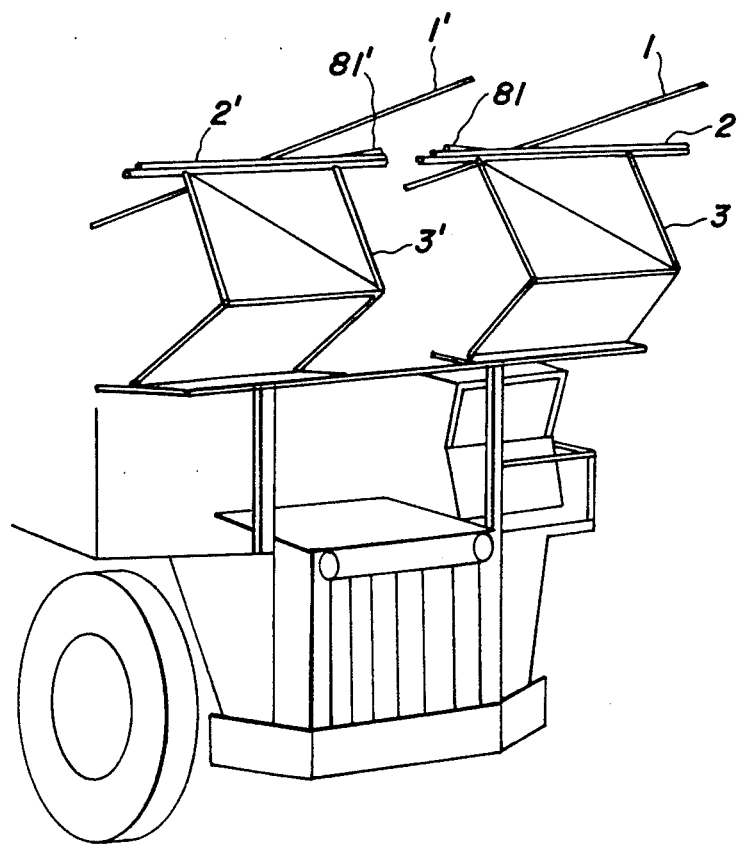

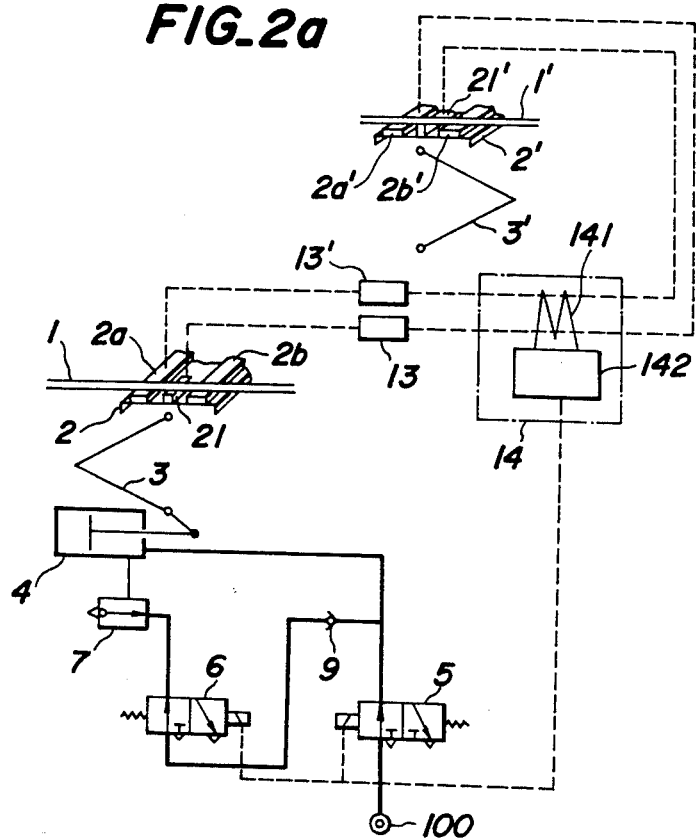
FIG_2a
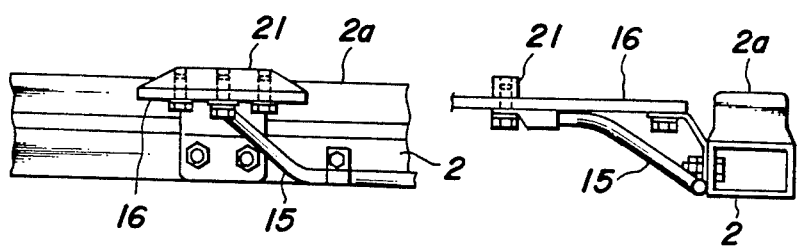
FIG_2b

OFFSET DETECTING DEVICE FOR TROLLEY-ASSISTED VEHICLES

BACKGROUND OF THE INVENTION

1. Field of the Invention

The present invention relates in general to trolley-assisted vehicles, such as dump trucks, used for the transportation of ores in large mines. In an area in which low cost electric supply is available and thus the fuel cost is comparatively high, trolley-assisted dump trucks are conveniently used nowadays for decreasing the transportation cost. Furthermore, in mines, in which contamination of the working pit by the exhaust gas of the dump trucks causes a big problem, the trolley-assisted dump trucks are used in practice for decreasing the amount of the exhaust gas. More especially, cheap main electric supply collected by means of a pair of pantographs from two-line contact wires of overhead contact system is utilized for the full load up-hill course starting from the working pit located at bottom to outside of the mine and to the contrary, the vehicle engine is used for the no load down-hill returning course.

The present invention relates particularly to an offset detecting device of the pantographs for the trolley-assisted dump trucks for protecting pantographs mounted on such trolley-assisted dump trucks.

2. Related Art Statement

In the full load up-hill course, in which the trolley-assisted dump trucks run in trolley mode, as there are no rails provided in general like railway systems and hence the trolley-assisted dump trucks run along so called endless rails, offset or off-center accidents of pantographs from the overhead contact systems may often be happened whenever the trolley-assisted dump trucks come out of the designated lane width which may be caused by doze of driver or careless driving.

Some conventional examples of such an offset detecting device of pantographs are shown in FIGS. 1-a, 1-b, and 1-c, which operate as a pneumatic controlling device.

FIG. 1-a shows a perspective view of the portion of pantographs of such a trolley-assisted vehicle, FIG. 1-b is a more detailed view of one pantograph and FIG. 1-c shows a controlling circuit thereof.

In these figures, reference numeral 1 (1') designates contact wire of the overhead system, and 2 (2') shows pantograph structure having two collector sliding plates 2a and 2b arranged in parallel. Reference numeral 3 shows frame work of the pantograph, 4 an air cylinder, 5 and 6 are electromagnetic valves, 8 a mechanical valve attached on the pantograph collector device for detecting offset condition of the pantographs, 10 a check valve, 11 is a throat valve of air line, 12 is a vehicle mounted battery, and a terminal 100 shows a vehicle mounted controlling pressurized air intake. In the figure, a thick line shows the pneumatic lines and dotted line shows the route of electric signal.

Among the above figures, FIG. 1b shows mounting condition of the mechanical valve mounted at pantograph offset condition detecting position of the pantograph 2. In FIG. 1b, 2 generally shows the structure of the pantograph collector, 2a a collector sliding plate, 81 a pressing plate, 82 a restoring spring, 8 a body of the mechanical valve, 83 a pressing rod for operating the mechanical valve, and 84 is an air line. Normally, by the action of the restoring spring 82, the pressing plate 81 would not press the pressing rod 83. But if the detecting position of the contact wire of the overhead system 1 is reached, the pressing plate 81 is pressed down further by overcoming the counteracting bias pressure of the restoring spring 82 and it presses down the pressing rod 83. By this action, the mechanical valve 8 is operated to exhaust the pressurized air in the air line 84.

Referring to the control circuit shown in FIG. 1c, normally, the supply of pneumatic pressure to the air cylinder 4 or evacuation of the same therefrom is controlled by an electromagnetic valve 5 and the pantograph is raised or lowered. During the trolley mode running with the pantograph in the raised up working position, if the mechanical valve 8 for the detection of offset condition is operated and the pressurized air in the air line 84 is evacuated, a pressure switch 9 detects this pressure down condition. A check valve or a throttle valve 10 is to limit air flow amount fed from pressurized air intake 100. By the operation of the pressure switch 9, an electric signal from the battery 12 energizes the electromagnetic valve 5 to lower down the pantograph. At the same time it energizes an electromagnetic valve 6 to operate a quick exhaust valve 7 to immediate evacuate of the air in the air cylinder 4 to lower the pantograph down to prepare the emergency condition. The check valve 10 is provided to prevent operation of the quick exhaust valve 7 in a normal pantograph lowering operation.

In the abovementioned conventional system, there is no much trouble concerning the electric insulation of the high voltage electric supply of the contact wire of the overhead system. However, there is a disadvantage in that the response speed of the mechanical valve is slow. Namely, the time required between the start of depressing the pressing plate 81 by the contact wire 1 of the overhead system and the operation of the mechanical valve 8 to bringing down the pantograph is too long. Thus the pantograph may collide against suspension member of the overhead systems during the above relatively long term and hence the safety protection for the pantograph is insufficient.

OBJECT OF THE INVENTION

The present invention has for its object to shorten the time required to bringing the pantograph down at the time of pantograph offset or off-center condition by electrically detecting the offset condition by using a contact element for detecting the offset condition having simple but rigid structure in place of the mechanical valve and to directly energize the electromagnetic valve for emergency lowering down of the pantographs.

SUMMARY OF THE INVENTION

In accordance with the present invention, a contact element for detecting the offset condition of the contact wire of the overhead system is provided on the collector device in an electrically insulated manner from the collector sliding plate. The offset condition detecting contact element on one of the pair of pantographs is connected through a current limiting impedance element to the collector sliding plate on the other pantograph in the pair. When the overhead contact wire comes in contact with the contact element of offset condition detecting member and causing a current to flow through the current limiting impedance element, said current is detected by a current detector and this detected electric signal is used to operate an electromagnetic valve for emergency lowering down the pantograph.

Thus the invention in general is an offset condition detecting device for trolley-assisted vehicles for lowering the pantograph down to rest position by electric detection of the offset condition and lowering down the pantographs at emergency base.

BRIEF DESCRIPTION OF THE DRAWINGS

FIGS. 1a, 1b and 1c show an embodiment of a conventional pantograph offset detecting device, which has been explained in the foregoing and in which;

FIG. 1a is a perspective view showing the mounting portion of pantograph,

FIG. 1b is two directional views showing the mechanical mounting of mechanical valve attached with the pantograph collector, FIG. 1c is a diagrammatic view of the pantograph and the associated controlling circuit therefor;

FIGS. 2a and 2b, and FIGS. 3a to 3c are two embodiments in accordance with the present invention; in which FIG. 2a and FIG. 3a show the pantograph and its associated controlling circuit, FIG. 2b and FIG. 3b show the construction of contact element for detecting offset condition and its mount on the pantograph collector, and FIG. 3c is a diagram showing operational principle of the contact element 121 for detecting the offset condition.

DESCRIPTION OF THE PREFERRED EMBODIMENTS

The invention will now be described by referring to the accompanying drawings.

Figure 1B:
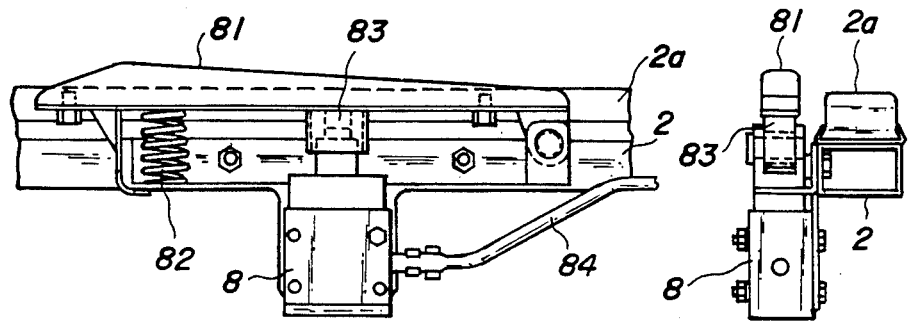
Figure 1C:
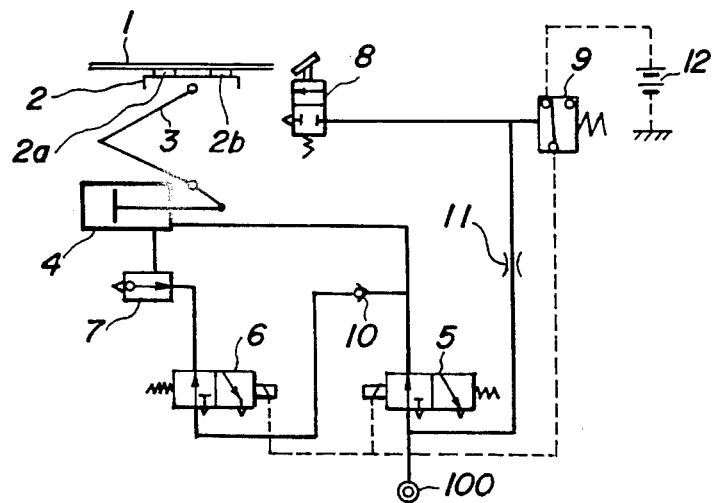

FIGS. 2a and 2b show a first embodiment of the present invention. In which corresponding parts with FIGS. 1a to 1c are shown by the same reference numerals. Those parts representing the elements on one system of the dual overhead system are shown by ordinary numerals and the parts on the other system are shown with prime on the respective corresponding reference numerals. The controlling circuit is shown only for one pantograph of a pair and the other pantograph controlling circuit is not shown since it is completely identical with that shown.

FIG. 2a shows pantograph and its controlling circuit. In this figure, reference numeral 21 and 21' are contact elements for detecting offset condition of the contact wires of overhead system, 13 and 13' are impedance elements for limiting the current and 14 shows current detector. This current detector 14 comprises a current transformer 141 and a current detector 142.

FIG. 2b shows detailed construction of the contact element 21 for detecting offset condition and its mount on the collector device 2. The contact element 21 is formed from conductive metal such a copper plate. This contact element 21 electrically detects contact between the contact wire 1 of the overhead system through an associated conducting wire 15. This element 21 is electrically insulated from the collector sliding plate 2a on the same collector device.

In the circuit shown in FIG. 2a, the contact element 21 of one pantograph 2 is connected through the current limiting impedance element 13 to the collector sliding plate 2a' of the other pantograph 2'. When the contact wire 1 of the overhead system is offset from right position and reaches to a predetermined detecting position, the contact wire comes in contact with the contact element 21. At this moment, the supply voltage through the contact wire is applied between the element 21 and the sliding plate 2a' on the other pantograph collector and a current limited by the current limiting impedance element 13 flows in the following route.

Overhead system (1) → contact element 21 → impedance element 13 → sliding plate 2a' → overhead system (1')

This current is derived by the current transformer 141 in an insulated condition and the level of the current is judged by the current detector 142. If this current exceeds a certain predetermined level, an emergency pantograph lowering signal is produced. This emergency or abnormal signal acts to deenergize the electromagnetic valve 5 and to energize the electromagnetic valve 6 and to operate a quick exhaust valve. Namely, the pantograph is pulled down in an emergency base and the damage of the pantograph by an off-line condition may be prevented well in advance.

Figure 3A:
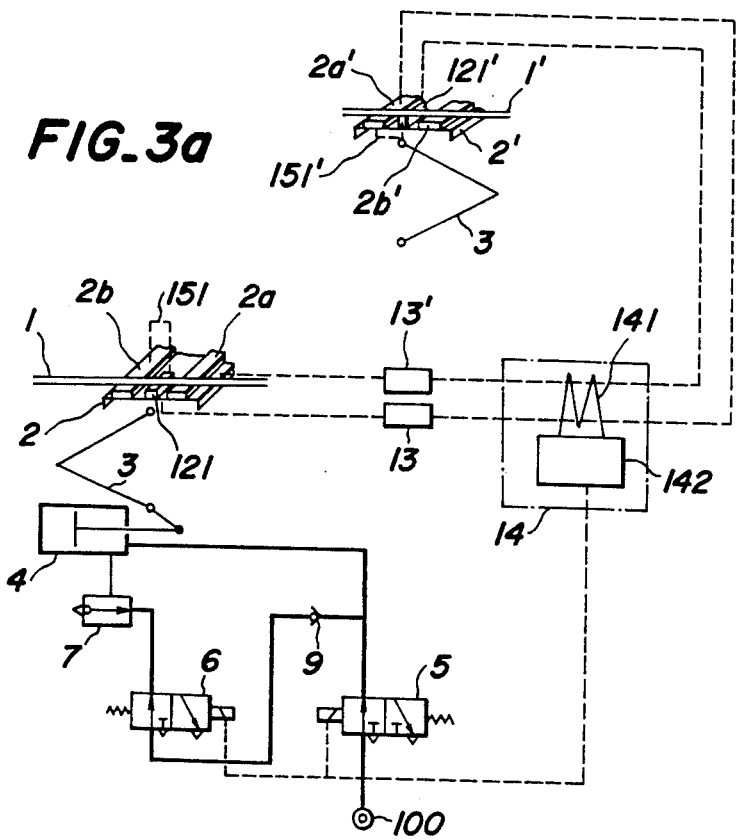
Figure 3B:
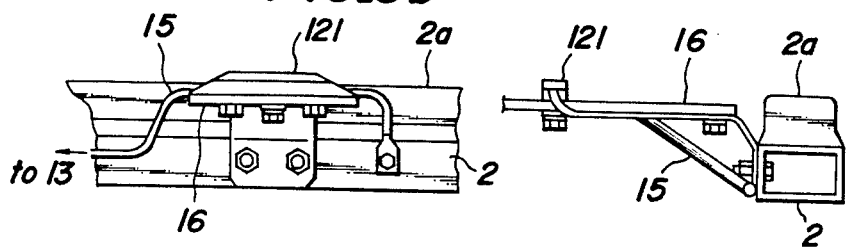
Figure 3C:
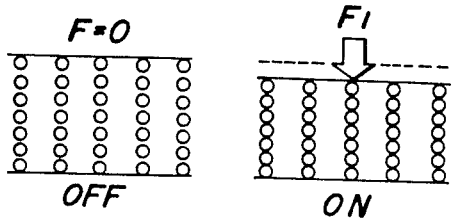

FIGS. 3a–3c show another embodiment of the present invention. In this embodiment, the contact elements 121 and 121' of the detecting members are formed of pressure sensitive conducting rubber varying its resistance from an insulating condition (over few tens $M\Omega$) to a conductive condition (less than few $\Omega$) according to applied pressure of the contact wire of the overhead system on to the contact element of the detecting member for an offset condition. One of the electrodes of the contact element is connected to respective pantograph collector device 2 or 2' and the other electrode of the member is connected through respective current limiting impedance 13 or 13' to the sliding plate 2' or 2 on other pantograph collector device. When the pantograph is offset from the overhead system and the contact element 121 of the detecting member is depressed by the overhead wire at a detecting position, the detecting member becomes conductive and a current limited by the current limiting impedance 13 flows through the following circuit.

overhead system (1) → contact element 121 of detecting member → impedance element 13 → sliding plate 2a' → overhead system (1')

This current is derived from the current transformer 141 in electrically insulated condition and the detected level is judged by the detector 142 and if the level exceeds a predetermined value an emergency pantograph lowering signal is produced. By this lowering signal, the electromagnetic valve 5 is turned off and the electromagnetic valve is turned on to actuate high speed exhaust valve to exhaust the air in the cylinder. Accordingly, the pantograph is lowered in an emergency base so that a damage of the pantograph can be prevented well in advance.

FIG. 2b shows one embodiment of the contact element 21 for detecting offset condition of the overhead system. It is apparent that various modifications for instance for the manner of insulation between the collector sliding plate, the construction of the contact member and its mount on the collector member can be considered in practice.

FIGS. 3a and 3b show one simple circuit and possible construction. From this embodiment it can be understood that the minimum necessary conditions for the detecting member are the followings.
(1) to be insulated from the collector sliding plate,
(2) to be mounted on the offset position of the overhead system, and
(3) to be able to detect the offset position of the overhead system by an electric contact.

The current transformer should be a dc current transformer when a dc overhead system is used, and it should be an ac current transformer when an ac overhead system is used.

As the current limiting impedance elements 13 and 13', a resistor may be used for a dc overhead system and a resistor or a capacitor may be used for an ac overhead system.

EFFECTS OF THE INVENTION

As has been explained in the foregoing, a high reliable, long life and low cost offset condition detecting device can be obtained which has no operational time lag in principle by using a simple and rigid offset condition detecting contact element and a current transformer being easily insulated electrically. So that a great advantage in preventing in advance the off-line accident of the pantograph from overhead system can be obtained. The effect of the inventive device in the utilization in industry is remarkable.

What is claimed is:

1. Offset condition detecting device of pantograph for trolley-assisted vehicles powered by an engine driven generator in non-trolley mode, and operated by outer power supply collected by a pair of vehicle mounted pantographs from two-line contact wires of an overhead system in trolley mode,
    the improvement comprising a contact element for detecting offset condition of the pantograph from the contact wire, the contact element being mounted on the pantograph in an electrically insulated manner from collector sliding plate,
    a current limiting impedance element connected in a circuit between the collector sliding plate of one pantograph of a pair and the offset condition detecting element on the other pantograph, and
    current detecting means for detecting electric current flowing through said current limiting impedance element,
    wherein the pair of pantographs are retracted down at emergency base when the detected current flowing through said impedance element exceeds a predetermined value.

2. Offset condition detecting device of pantograph for trolley-resisted vehicles as claimed in claim 1, wherein the contact element for detecting the offset condition of the pantograph from the contact wire is electrically insulated from the collector sliding plate and from the pantograph when the sliding plate is not in contact with the contact wire.

3. Offset condition detecting device of pantograph for trolley-resisted vehicles as claimed in claim 1, wherein the contact element for detecting the offset condition is made of pressure sensitive variable conductance rubber.

4. Offset condition detecting device of pantograph for trolley-resisted vehicles as claimed in claim 3, wherein the pressure sensitive variable conductance rubber changes its conductance from an insulative resistance (over few tens M$\Omega$) to conductive condition (less than few $\Omega$) depending on the applied pressure.

* * * * *